(«12») United States Patent
Hong

(10) Patent No.: US 9,778,864 B2
(45) Date of Patent: Oct. 3, 2017

(54) DATA STORAGE DEVICE USING NON-SEQUENTIAL SEGMENT ACCESS AND OPERATING METHOD THEREOF

(71) Applicant: SK hynix Inc., Gyeonggi-do (KR)

(72) Inventor: Ji Man Hong, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 207 days.

(21) Appl. No.: 14/743,688

(22) Filed: Jun. 18, 2015

(65) Prior Publication Data

US 2016/0266823 A1 Sep. 15, 2016

(30) Foreign Application Priority Data

Mar. 10, 2015 (KR) .................. 10-2015-0033103
May 15, 2015 (KR) .................. 10-2015-0068275

(51) Int. Cl.
*G06F 12/00* (2006.01)
*G06F 3/06* (2006.01)
*G06F 12/02* (2006.01)
*G06F 13/00* (2006.01)
*G06F 13/28* (2006.01)

(52) U.S. Cl.
CPC ............ *G06F 3/0619* (2013.01); *G06F 3/068* (2013.01); *G06F 3/0655* (2013.01); *G06F 12/0238* (2013.01); *G06F 2212/7207* (2013.01); *G06F 2212/7209* (2013.01)

(58) Field of Classification Search
CPC .. G06F 3/0619; G06F 12/0238; G06F 3/0655; G06F 3/068; G06F 2212/7209; G06F 2212/7207
See application file for complete search history.

(56) References Cited

U.S. PATENT DOCUMENTS

| 6,760,805 | B2* | 7/2004 | Lasser | G06F 12/0246 365/185.11 |
|---|---|---|---|---|
| 7,526,599 | B2* | 4/2009 | Chang | G06F 12/0246 711/103 |
| 2002/0069314 | A1* | 6/2002 | Miyauchi | G06F 12/0292 711/103 |
| 2007/0245069 | A1* | 10/2007 | Kikuchi | G06F 12/0246 711/103 |
| 2012/0320679 | A1* | 12/2012 | Sprouse | G11C 7/1015 365/185.12 |

FOREIGN PATENT DOCUMENTS

KR 1020110116865 10/2011

* cited by examiner

*Primary Examiner* — Mark Giardino, Jr.
(74) *Attorney, Agent, or Firm* — IP & T Group LLP

(57) ABSTRACT

A data storage device may include: a nonvolatile memory device comprising a plurality of memory blocks, each having a plurality of pages, wherein each of the pages is divided into a plurality of segments having predetermined segment offset values, and the plurality of segments are grouped into a plurality of segment groups, each comprising segments having the same segment offset value; and a controller suitable for storing data in a first segment group among the plurality of segment groups until the first segment group includes no more empty segments.

19 Claims, 11 Drawing Sheets

DATA STORAGE DEVICE USING NON-SEQUENTIAL SEGMENT ACCESS AND OPERATING METHOD THEREOF

CROSS-REFERENCES TO RELATED APPLICATION

The present application claims priority under 35 U.S.C. §119(a) to Korean application number 10-2015-0033103, filed on Mar. 10, 2015, and Korean application number 10-2015-0068275, filed on May 15, 2015, in the Korean Intellectual Property Office, which is incorporated herein by reference in its entirety.

BACKGROUND

1. Technical Field

Various embodiments relate to a data storage device and, more particularly, to a data storage device including a nonvolatile memory device.

2. Related Art

A data storage device may be configured to store data provided from an external device in response to a write request from the external device. Furthermore, the data storage device may be configured to provide data stored therein to the external device in response to a read request from the external device. The external device is an electronic device capable of processing data, such as a computer, a digital camera, or a mobile phone. The data storage device may be embedded in the external device or separately fabricated and connected to the external device.

The data storage device may be configured by a Personal Computer Memory Card International Association (PCM-CIA) card, a Compact Flash (CF) card, a smart media card, a memory stick, a multimedia card (MMC), an embedded MMC (eMMC), a reduced-size multimedia card (RS-MMC) and a micro-size multimedia card (MMC-micro), a Secure Digital (SD) card, a mini secure digital (Mini-SD) and a micro secure digital (Micro-SD), a Universal Flash Storage (UFS), a Solid State Drive (SSD) and the like.

The data storage device may include a nonvolatile memory apparatus in order to store data. The nonvolatile memory apparatus may retain stored data even without power. The nonvolatile memory apparatus may include a flash memory apparatus such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

SUMMARY

Various embodiments are directed to a data storage device and an operating method thereof, capable of minimizing/reducing data distortion and improving data reliability by non-sequentially accessing adjacent segments included in one page.

In an embodiment of the present invention, a data storage device may include: a nonvolatile memory device comprising a plurality of memory blocks, each having a plurality of pages, wherein each of the pages is divided into a plurality of segments having predetermined segment offset values, and the plurality of segments are grouped into a plurality of segment groups, each comprising segments having the same segment offset value; and a controller suitable for storing data in a first segment group among the plurality of segment groups until the first segment group includes no more empty segments.

In an embodiment of the present invention, a data storage device may include: a nonvolatile memory device comprising a first memory block having a plurality of segment groups; and a controller suitable for performing an invalidation operation on a first segment group among the plurality of segment groups when valid data remain in the first segment group, before data are stored in a second segment group adjacent to the first segment group.

In an embodiment of the present invention, an operating method of a data storage device may include: storing first data in a first segment of a first segment group of a first memory block, wherein the first memory block includes a plurality of pages, each of the pages is divided into a plurality of segments having predetermined segment offset values, and the plurality of segments are grouped into a plurality of segment groups, each comprising segments having the same segment offset value; and storing second data, which is to be stored in the first memory block subsequently to the first data, in a second segment of the first segment group when the first segment is not the last segment of the first segment group.

BRIEF DESCRIPTION OF THE DRAWINGS

Features, aspects, and embodiments are described in conjunction with the attached drawings, in which.

DETAILED DESCRIPTION

Figure 1:
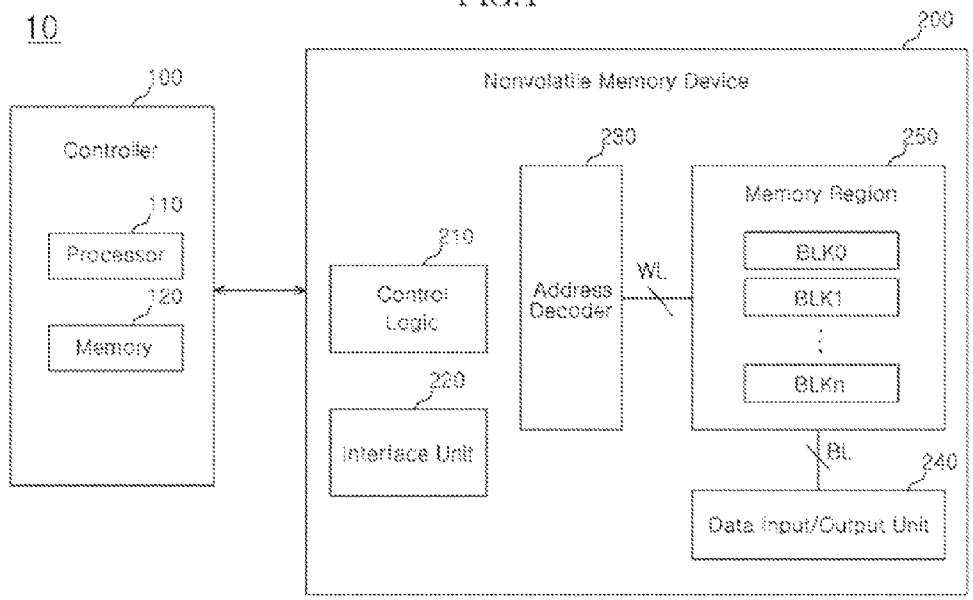
FIG. 1 is a block diagram illustrating a data storage device according to an embodiment of the present invention.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

FIG. 1 is a block diagram illustrating a data storage device 10 according to an embodiment of the present invention.

Referring to FIG. 1, the data storage device 10 may include a controller 100 and a nonvolatile memory device 200.

The controller 100 may include a processor 110 and a memory 120.

The processor 110 may control overall operations of the data storage device 10. The processor 110 may control a write or read operation of the nonvolatile memory device 200 in response to a write or read request from an external device. The processor 110 may generate a command for controlling the operation of the nonvolatile memory device 200, and provide the generated command to the nonvolatile memory device 200. The processor 110 may drive a software program on the memory 120 so as to control the operation of the data storage device 10.

The memory 120 may serve as a working memory, a buffer memory, or a cache memory of the processor 110. The memory 120 may serve as the working memory which stores various program data and a software program driven by the processor 110. The memory 120 may serve as the buffer memory which buffers data transmitted between an external device and the nonvolatile memory device 200. The memory 120 may serve as the cache memory which temporarily stores cache data.

The nonvolatile memory device 200 may include a control logic 210, an interface unit 220, an address decoder 230, a data input/output unit 240, and a memory region 250.

The control logic 210 may control overall operations such as a write operation, a read operation, and an erase operation of the nonvolatile memory device 200 in response to a command provided from the controller 100.

The interface unit 220 may exchange data and various control signals including commands and addresses with the controller 100. The interface unit 220 may transmit the various control signals and data to internal units of the nonvolatile memory device 200.

The address decoder 230 may decode row and column addresses transmitted from the Interface unit 220. The address decoder 230 may control word lines WL to be selectively driven in response to the decoded row address. The address decoder 230 may control the data input/output unit 240 to selectively drive bit lines BL in response to the decoded column address.

The data input/output unit 240 may transmit the data received from the interface unit 220 to the memory region 250 through bit lines BL. The data input/output unit 240 may transmit the data read from the memory region 250 through the bit lines BL to the interface unit 220.

The memory region 250 may be coupled to the address decoder 230 through the word lines WL, and coupled to the data input/output unit 240 through the bit lines BL. The memory region 250 may be implemented with a three-dimensional (3D) memory cell array, for example.

The memory region 250 may include a plurality of memory cells arranged at the respective intersections between the word lines WL and the bit lines BL. The memory cells may be divided according to the number of data bits stored per a memory cell. For example, the memory cells may be divided into single level cells, each capable of storing one bit, and multi-level cells, each capable of storing two or more bits.

The memory region 250 may include a plurality of memory blocks BLK1 to BLKn. The memory block may correspond to a unit for an erase operation performed by the nonvolatile memory device 200. That is, the nonvolatile memory device 200 may perform the erase operation in units of memory blocks.

Figure 2:
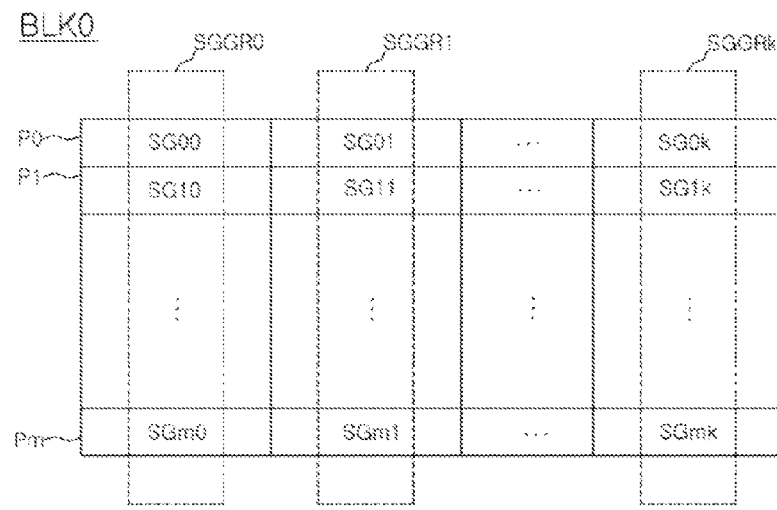
FIG. 2 is a diagram illustrating a memory block of FIG. 1.

FIG. 2 is a diagram illustrating the memory block BLK0 of FIG. 1 in detail. In FIG. 1, the plurality of memory blocks BLK1 to BLKn may be configured in substantially the same manner as the memory block BLK0.

Referring to FIG. 2, the memory block BLK0 may include a plurality pages P0 to Pm.

Each of the pages P0 to Pm may have a unique page offset value. For example, the page P0 may have a page offset value of 0, and the page P1 may have a page offset value of 1. Each of the pages P0 to Pm may be accessed by driving a corresponding word line. The number of pages corresponding to one word line, that is, the number of pages which may be accessed by driving one word line may differ depending on the number of bits stored in each of memory cells coupled to the word line. When i-bit data is stored in one memory cell, i pages may correspond to one word line. In this case, i bits stored in the memory cell may be stored by one bit in i different pages, respectively.

Each of the pages P0 to Pm may be divided into a plurality of segments SG00 to SGmk having constant segment offset values. For example, the page P0 may be divided into a plurality of segments SG00 to SG0k. Each of the segments SG00 to SGmk may have a unique segment offset value. A plurality of segments divided from one page may have unique segment offset values which are sequentially assigned. For example, in the page P0, the segment SG00 may have a segment offset value of 0, and the segment SG01 may have a segment offset value of 1. Each of the segments SG00 to SGmk may be identified by an address which is assigned according to the segment offset value thereof, and accessed to store data. The segment may correspond to a unit for a write operation performed by the nonvolatile memory device 200. That is, the nonvolatile memory device 200 may perform a write operation in units of segments.

The plurality of segments SG00 to SGmk may be grouped into a plurality of segment groups SGGR0 to SGGRk, and each of the segment groups SGGR0 to SGGRk may include segments having the same segment offset value, among the plurality of segments SG00 to SGmk. For example, among the plurality of segments SG00 to SGmk, the segments SG00 to SGm0 having a segment offset value of 0 may be grouped into the first segment group SGGR0, and the segments SG01 to SGm1 having a segment offset value of 1 may be grouped into the second segment group SGGR1.

Referring back to FIG. 1, when the processor 110 stores data in a certain memory block, the memory block may correspond to an open memory block. The open memory block may indicate a memory block which is designated to write data therein by the processor 110, among the plurality of memory blocks. When the open memory block has no more empty spaces after data are stored in the open memory block, the processor 110 may switch the open memory block to a closed memory block.

An open segment group may indicate a segment group which is designated to write data therein by the processor 110, among the segment groups included in the open memory block. When the open segment group has no more empty segments after data are stored in the open segment group, the processor 110 may switch the open segment group to a closed segment group.

The processor 110 may designate any one of empty segment groups included in the open memory block as an open segment group. Until the open segment group is switched to the closed segment group, that is, until the open segment group includes no more empty segments, the processor 110 may store data only in the open segment group. The processor 110 may store data in the segments included in the open segment group according to a page offset sequence of the pages P0 to Pm, for example. When the open segment group includes no more empty segments, the processor 110 may designate an empty segment group of the segment groups as an open segment group, and store data in the newly designated open segment group.

According to the related art, the processor 110 may store data in units of segments, and sequentially store data in segments included in one page. For example, when first data is stored in the segment SG00 of FIG. 2, second data to be stored in the memory block BLK0 subsequently to the first data may be stored in the segment SG01. However, when the first and second data are successively stored in adjacent segments, for example, SG00 and SG01, in one page, the first data which is stored prior to the second data may be distorted due to the write operation on the second data. According to the present embodiment, however, the processor 110 may store data only in a designated open segment group among a plurality of segment groups included in an open memory block. Thus, adjacent segments included in one page may be non-sequentially accessed. For example, suppose that frequently updated data is stored in a first segment which is first accessed between two adjacent segments included in one page. Then, when data is stored in a second segment which is later accessed, the data stored in the first segment may already be invalidated. Thus, according to the embodiment of the present disclosure, data distortion may be reduced/minimized, and the data reliability may be improved.

Depending on embodiments, the processor 110 may perform an invalidation operation in units of segment groups. When performing an invalidation operation on a target segment group, the processor 110 may transfer valid data stored in the target segment group to another open memory block. A process for the processor 110 to transfer the valid data stored in the target segment group to another open memory block may include a process of copying the valid data into another open memory block and a process of invalidating the original valid data stored in the target segment group. After the processor 110 performs the invalidation operation on the target segment group, only invalid data may remain in the target segment group. Thus, according to the embodiment of the present disclosure, a segment group adjacent to the target segment group on which the processor 110 has performed the invalidation operation, that is, a segment group adjacent to an invalidated segment group, may be designated as an open segment group. Then, when data are stored in the open segment group, the risk of data distortion may be eliminated since the valid data which had been stored in the invalidated segment group were already transferred to safe positions.

When switching an open segment group including no empty segments to a closed segment group, the processor 110 may perform an invalidation operation on the closed segment group. When valid data remain in a segment group adjacent to the open segment group, that is, an adjacent closed segment group, before data are stored in the open segment group, the processor 110 may perform an invalidation operation on the adjacent closed segment group.

In another embodiment, when performing an invalidating operation on a target segment group, the processor 110 may transfer valid data stored in the target segment group to another segment group in the same memory block, except for the target segment group. A process for the processor 110 to transfer the valid data stored in the target segment group to another segment group in the same memory block may include copying the valid data into another segment group in the same memory block and invalidating the original valid data stored in the target segment group. The processor 110 may switch the target segment group to a closed segment group, and designate the segment group to which the valid data are newly transferred, as a new open segment group.

Figure 3:
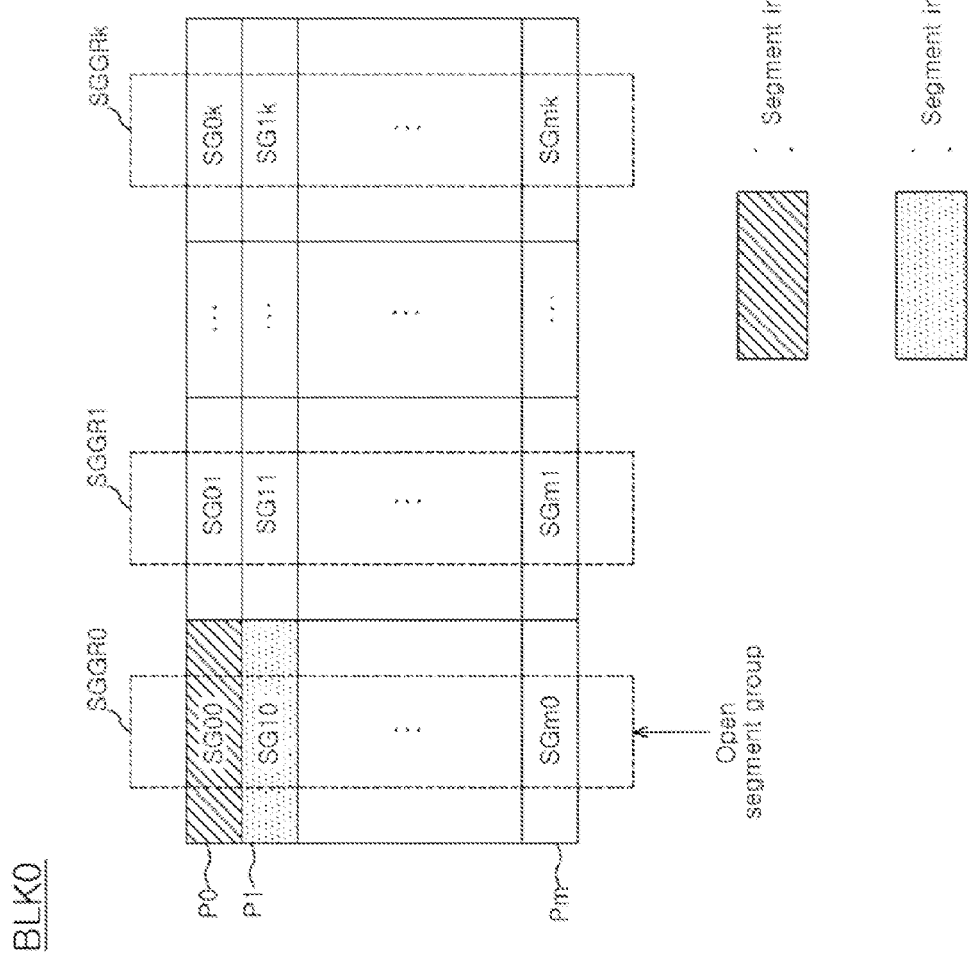
FIG. 3 is a diagram for describing an operating method of the data storage device of FIG. 1.

FIG. 3 is a diagram for describing an operating method of the data storage device 10 of FIG. 1.

Referring to FIG. 3, the processor 110 may designate the segment group SGGR0 as an open segment group in the memory block BLK0. The processor 110 may store data only in the open segment group SGGR0 until the segment group SGGR0 includes no more empty segments. The processor 110 may store data in the segments SG00 to SGm0 included in the open segment group SGGR0 according to the page offset sequence of the pages P0 to Pm, for example. When the segment SG00 stores first data, the processor 110 may store second data, which is to be stored in the memory block BLK0 subsequently to the first data, in the segment SG10.

Figure 4:
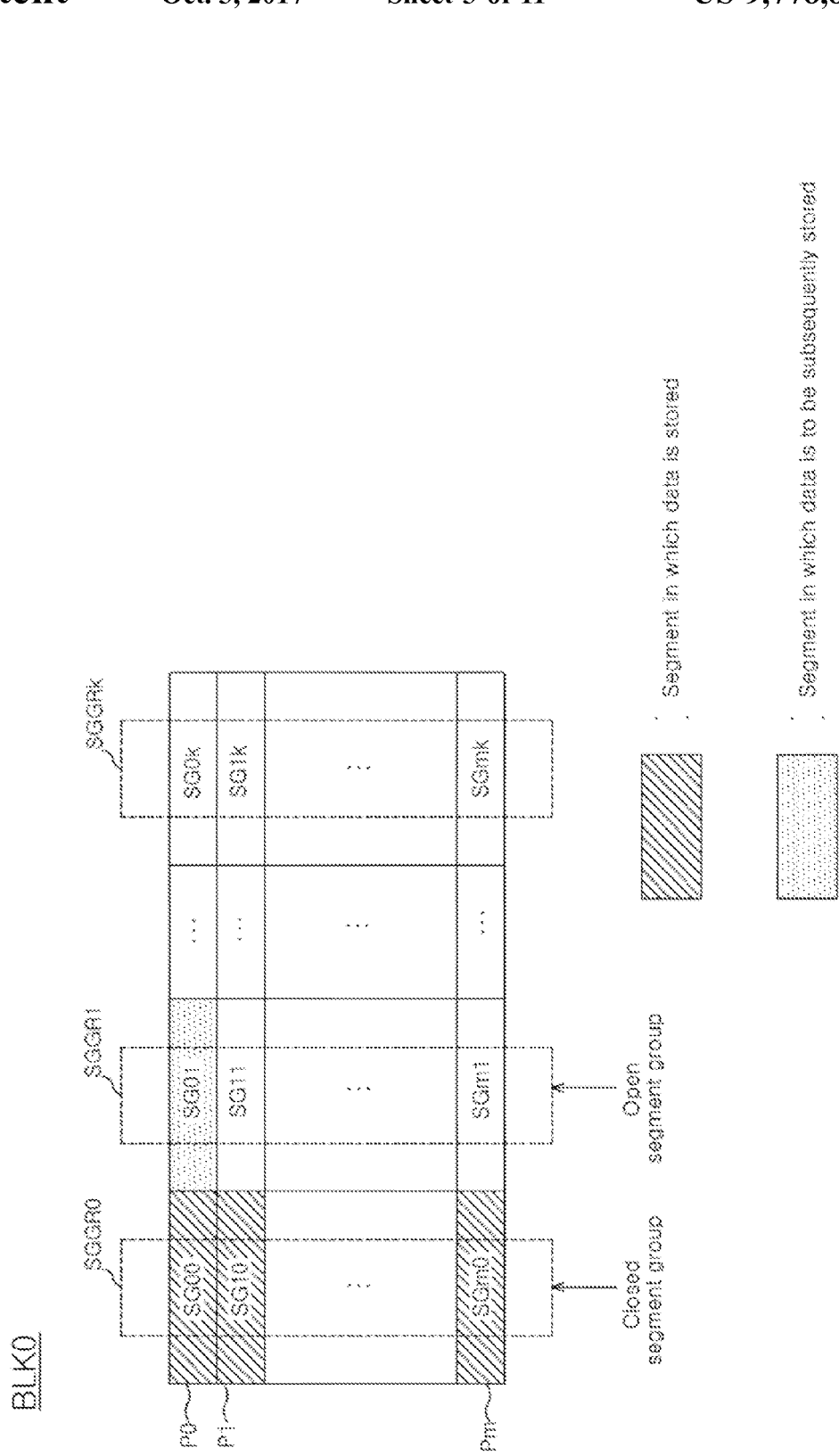
FIG. 4 is a diagram for describing an operating method of the data storage device of FIG. 1.

FIG. 4 is a diagram for describing an operating method of the data storage device 10 of FIG. 1.

Referring to FIG. 4, when the segment group SGGR0 designated as an open segment group has no more empty segments after data are stored only in the segment group SGGR0 designated as the open segment group, the processor 110 may switch the segment group SGGR0 to a closed segment group. The processor 110 may designate the empty segment group SGGR1 as a new open segment group. The processor 110 may store data, which is to be subsequently stored in the memory block BLK0, in the segment SG01.

Figure 5:
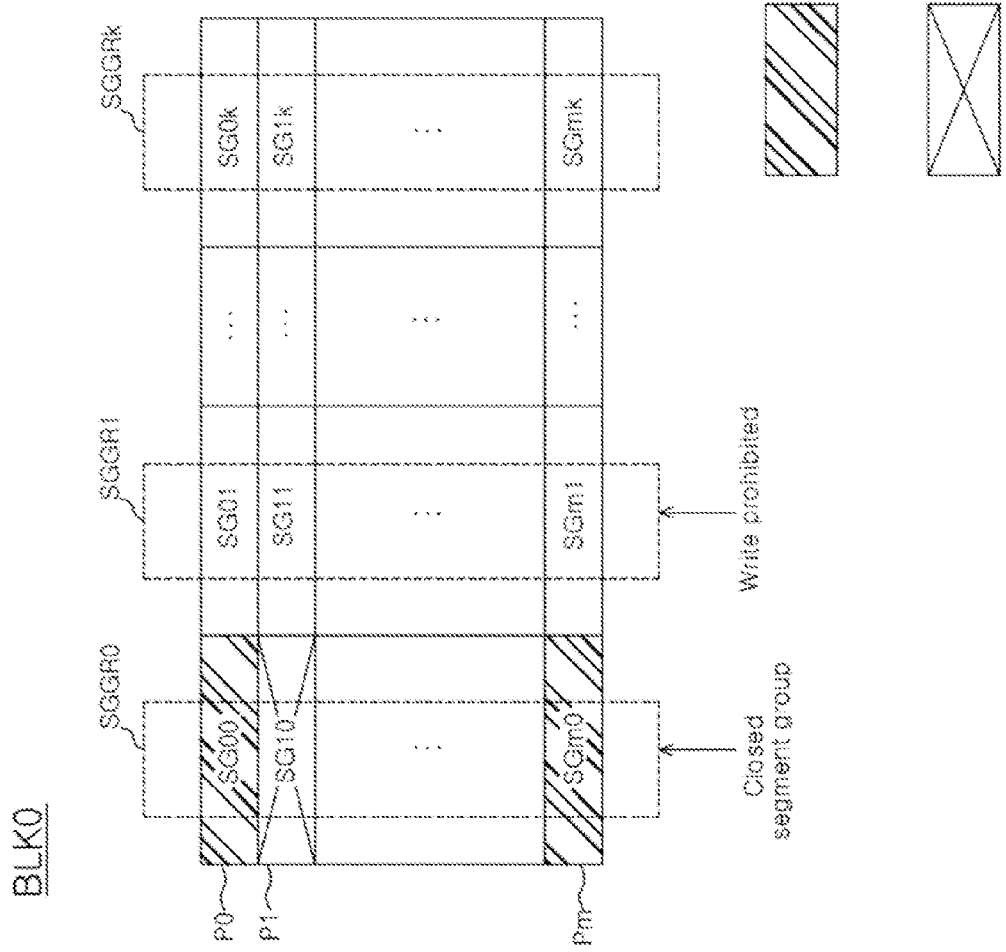
FIGS. 5 and 6 are diagrams for describing an invalidation operation of the data storage device of FIG. 1.
Figure 6:
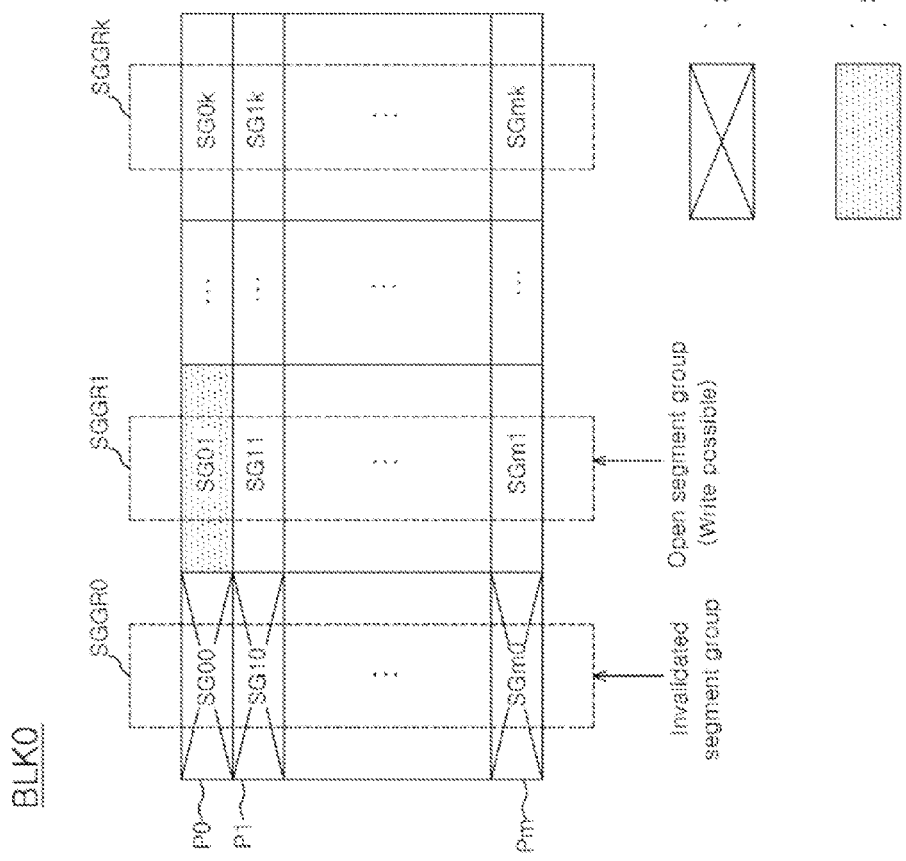

FIGS. 5 and 6 are diagrams for describing an invalidation operation of the data storage device 10 of FIG. 1.

Referring to FIG. 5, the processor 110 may switch the open segment group SGGR0, which includes no more empty segments, to a closed segment group. At this time, when data is immediately stored in the segment group SGGR1 adjacent to the segment group SGGR0, there is a risk that valid data stored in the segment SG00 is likely to be distorted.

In order to remove the risk of data distortion, the processor 110 may additionally perform an invalidation operation in units of segment groups. When the open segment group SGGR0 including no more empty segments is switched to the closed segment group, the processor 110 may not immediately store data in the adjacent segment group SGGR1, but perform an invalidation operation on the segment group SGGR0. When performing the invalidation operation on the segment group SGGR0, the processor 110 may transfer valid data stored in the segment group SGGR0 to another open memory block. Alternatively, when performing the invalidation operation on the segment group SGGR0, the processor 110 may transfer valid data stored in the segment group SGGR0 to another segment group in the same memory block, except for the segment group SGGR0.

Referring to FIG. 6, the processor 110 may designate the empty segment group SGGR1 adjacent to the invalidated segment group SGGR0 as an open segment group. The processor 110 may store data, which is to be subsequently stored in the memory block BLK0, in the segment SG01, without a risk of data distortion.

Figure 7:
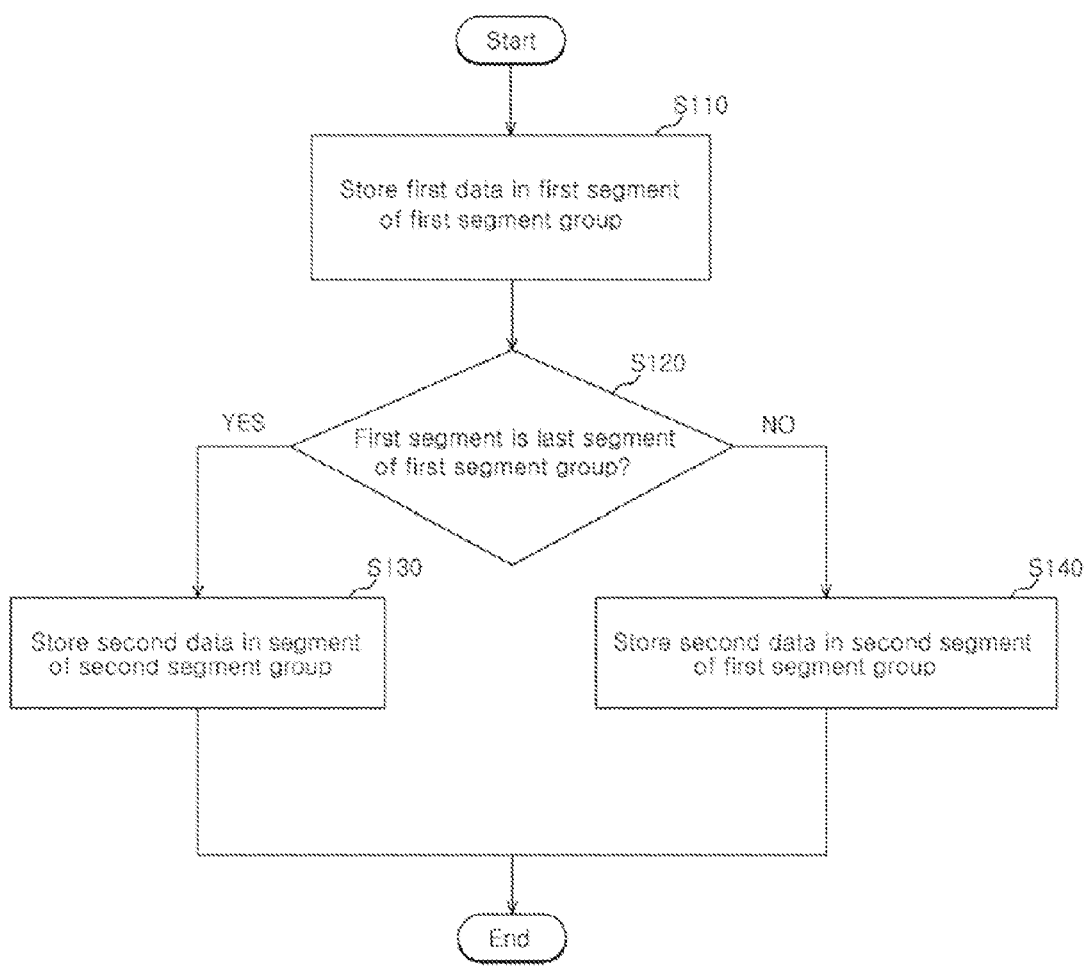
FIG. 7 is a flow chart for describing an operating method of the data storage device of FIG. 1.

FIG. 7 is a flow chart for describing an operating method of the data storage device 10 of FIG. 1.

Referring to FIG. 7, at step S110, the processor 110 may store first data in a first segment of a first segment group among a plurality of empty segment groups of a first memory block. The processor 110 may designate the first segment group as an open segment group.

At step S120, the processor 110 may determine whether the first segment is the last segment of the first segment group. When the first segment group includes no more empty segments, the processor 110 may determine that the first segment is the last segment of the first segment group. When the first segment is the last segment of the first segment group, the procedure may proceed to step S130. When the first segment is not the last segment of the first segment group, the procedure may proceed to step S140.

At step S130, when the first segment is the last segment of the first segment group, the processor 110 may store second data, which is to be stored in the first memory block subsequently to the first data, in a segment of a second segment group among the plurality of empty segment groups of the first memory block. The processor 110 may designate the second segment group as a new open segment group of the first memory block.

At step S140, when the first segment is not the last segment of the first segment group, the processor 110 may store the second data, which is to be stored in the first memory block subsequently to the first data, in a second segment of the first segment group.

Figure 8:
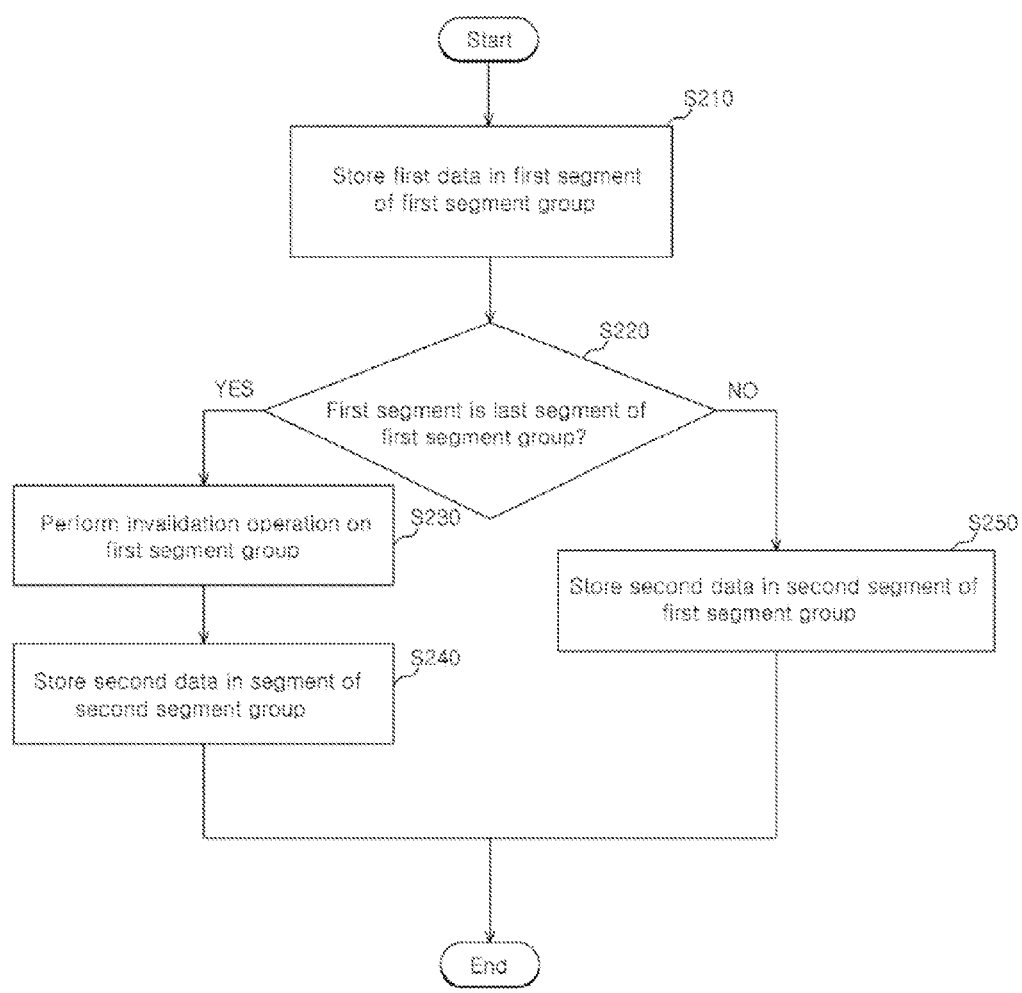
FIG. 8 is a flow chart for describing an operating method of the data storage device of FIG. 1.

FIG. 8 is a flow chart for describing an operating method of the data storage device 10 of FIG. 1. FIG. 8 illustrates a process of additionally performing an invalidation operation in the process of FIG. 7.

Referring to FIG. 8, at step S210, the processor 110 may store first data in a first segment of a first segment group among a plurality of empty segment groups of a first memory block. The processor 110 may designate the first segment group as an open segment group.

As step S220, the processor 110 may determine whether the first segment is the last segment of the first segment group. When the first segment group includes no more segments, the processor 110 may determine that the first segment is the last segment of the first segment group. When the first segment is the last segment of the first segment group, the procedure may proceed to step S230. When the first segment is not the last segment of the first segment group, the procedure may proceed to step S250.

At step S230, when the first segment is the last segment of the first segment group, the processor 110 may perform an invalidation operation on the first segment group. The processor 110 may transfer valid data stored in the first segment group to the second memory block.

At step S240, the processor 110 may store second data, which is to be stored in the first memory block subsequently to the first data, in a segment of a second segment group among the plurality of empty segment groups of the first memory block. The processor 110 may designate the second segment group as a new open segment group of the first memory block.

At step S250, when the first segment is not the last segment of the first segment group, the processor 110 may store the second data, which is to be stored in the first memory block subsequently to the first data, in a second segment of the first segment group.

Figure 9:
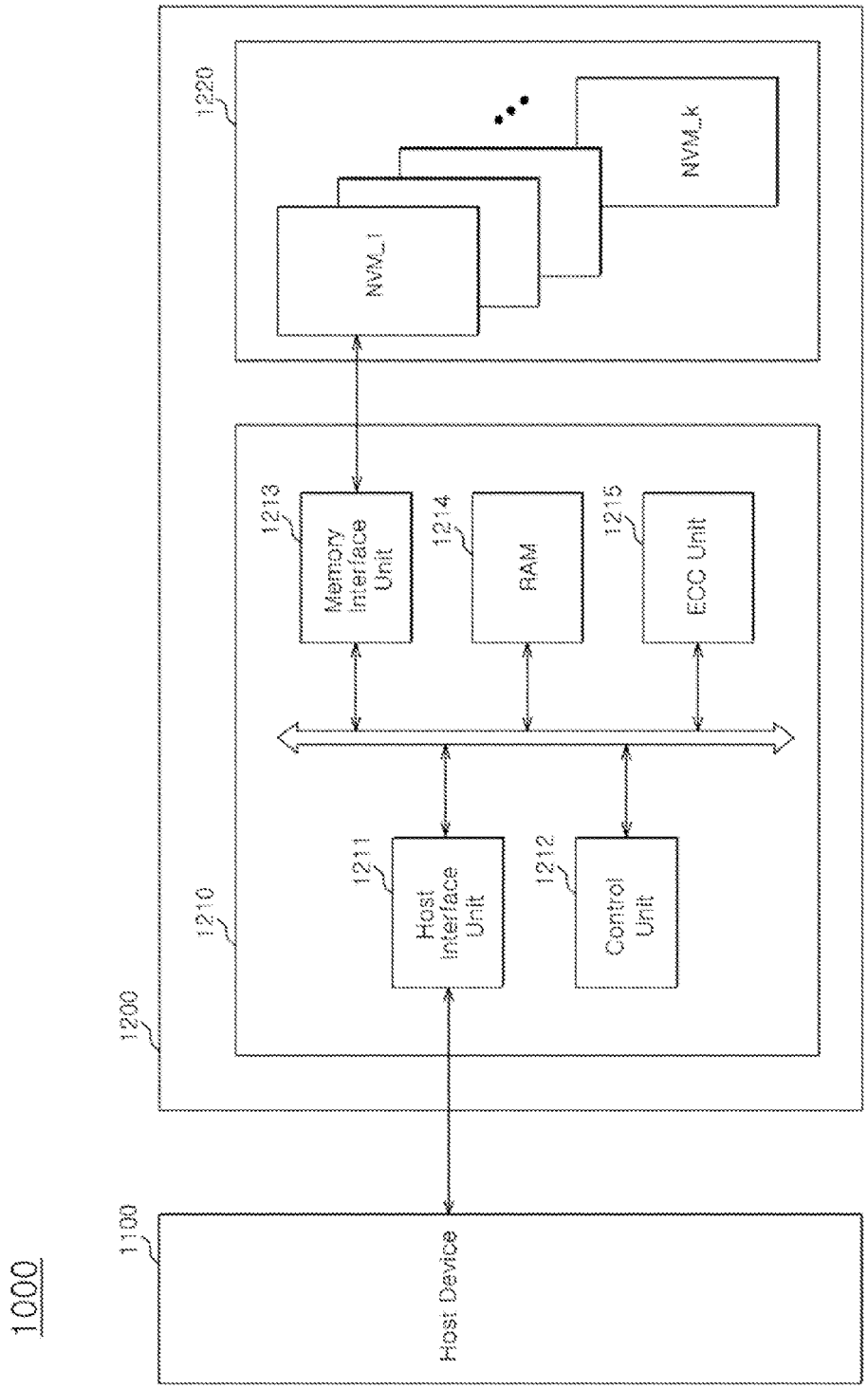
FIG. 9 is a block diagram exemplarily illustrating a data processing system including a data storage device according to an embodiment of the inventive concept.

FIG. 9 is a block diagram exemplarily illustrating a data processing system including a data storage device according to an embodiment of the inventive concept.

A data processing system 1000 may include a host device 1100 and a data storage device 1200. The data storage device 1200 may include a controller 1210 and a nonvolatile memory device 1220. The data storage device 1200 may be accessed by the host device 1100 such as a portable phone, a MP3 player, a laptop computer, a desktop computer, a game machine, a TV, or an in-vehicle system, and used.

The controller 1210 may include a host interface unit 1211, a control unit 1212, a memory interface unit 1213, a RAM 1214, and an error correction code (ECC) unit 1215.

The control unit 1212 may control overall operation of the controller 1210 in response to a request of the host device 1100. The control unit 1212 may drive firmware or software for controlling the nonvolatile memory device 1220. The control unit 1212 may have the same configuration as the processor 110 described with reference to FIG. 1 and may perform the same operation as the operation of the processor 110 described with reference to FIGS. 7 to 8.

The RAM 1214 may be used as a working memory of the control unit 1212. The RAM 1214 may be used as a buffer memory which temporarily stores data read out from the nonvolatile memory device 1220 or data provided from the host device 1100.

The host interface unit 1211 may perform interfacing between the host device 1100 and the controller 1210. For example, the host interface unit 1211 may perform communication with the host device 1100 through one of various interface protocols such as a USB protocol, a UFS protocol, a MMC protocol, a PCI protocol, a PCI-E protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 1213 may perform interfacing between the controller 1210 and the nonvolatile memory device 1220. The memory interface unit 1213 may provide a command and an address to the nonvolatile memory device 1220. The memory interface unit 1213 may exchange data with the nonvolatile memory device 1220.

The ECC unit 1215 may detect an error of data read out from the nonvolatile memory device 1220. The ECC unit 1215 may be configured to correct the detected error when the detected error is in a correctable range.

The nonvolatile memory device 1220 may be used as a storage medium of the data storage device 1200. The nonvolatile memory device 1220 may include a plurality of nonvolatile memory chips (or dies) NVM1_1 to NVM_k.

The controller 1210 and the nonvolatile memory device 1220 may be fabricated with one of various data storage devices. For example, the controller 1210 and the nonvolatile memory device 1220 may be integrated in one semiconductor device and fabricated with any one of a multimedia card in the form of an MMC, an eMMC, an RS-MMC, and a micro-MMC, a secure digital card in the form of an SD, a mini-SD, and a micro-SD, a USB storage device, a UFS device, a PCMCIA card, a CF card, a smart media card, and a memory stick.

Figure 10:
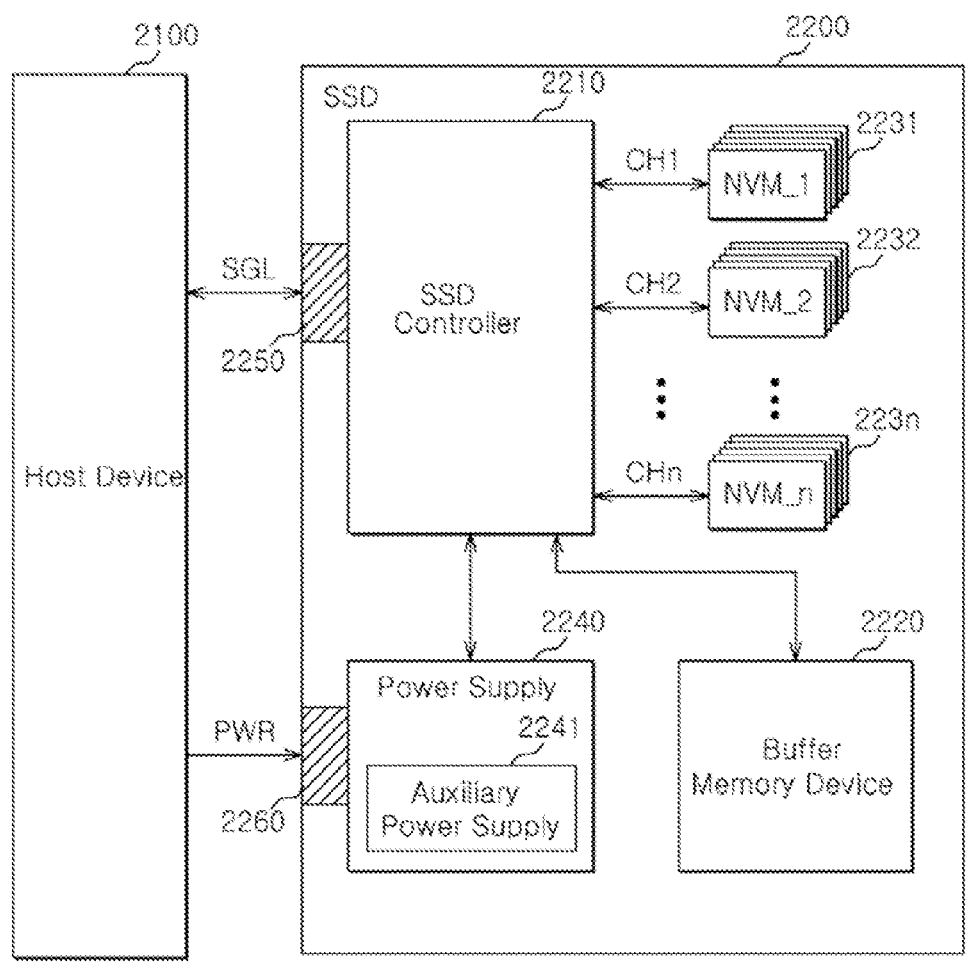
FIG. 10 is a block diagram exemplarily illustrating a data processing system including an SSD according to an embodiment of the inventive concept.

FIG. 10 is a block diagram exemplarily illustrating a data processing system including an SSD according to an embodiment of the inventive concept.

A data processing system 2000 may include a host device 2100 and a SSD 2200.

The SSD 2200 may include a SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data to be stored in the nonvolatile memory devices 2231 to 223n. The buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n according to control of the SSD controller 2210.

The nonvolatile memory devices 2231 to 223n may be used as storage media of the SSD 2200. The nonvolatile memory devices 2231 to 223n may be coupled to the SSD controller 2210 through a plurality of channels CH1 to CHn. One or more nonvolatile memory devices may be coupled to one channel. The nonvolatile memory devices coupled to one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply power so that the SSD 2200 is normally terminated in a sudden power-off. The auxiliary power supply 2241 may include super capacitors which may charge the power PWR.

The SSD controller 2210 may exchange a signal SGL with the host device 2100 through the signal connector 2250. The signal SGL may include a command, an address, data, and the like. The signal connector 2250 may be configured of a connector such as PATA, SATA, SCSI, SAS, PCI, or PCI_E.

Figure 11:
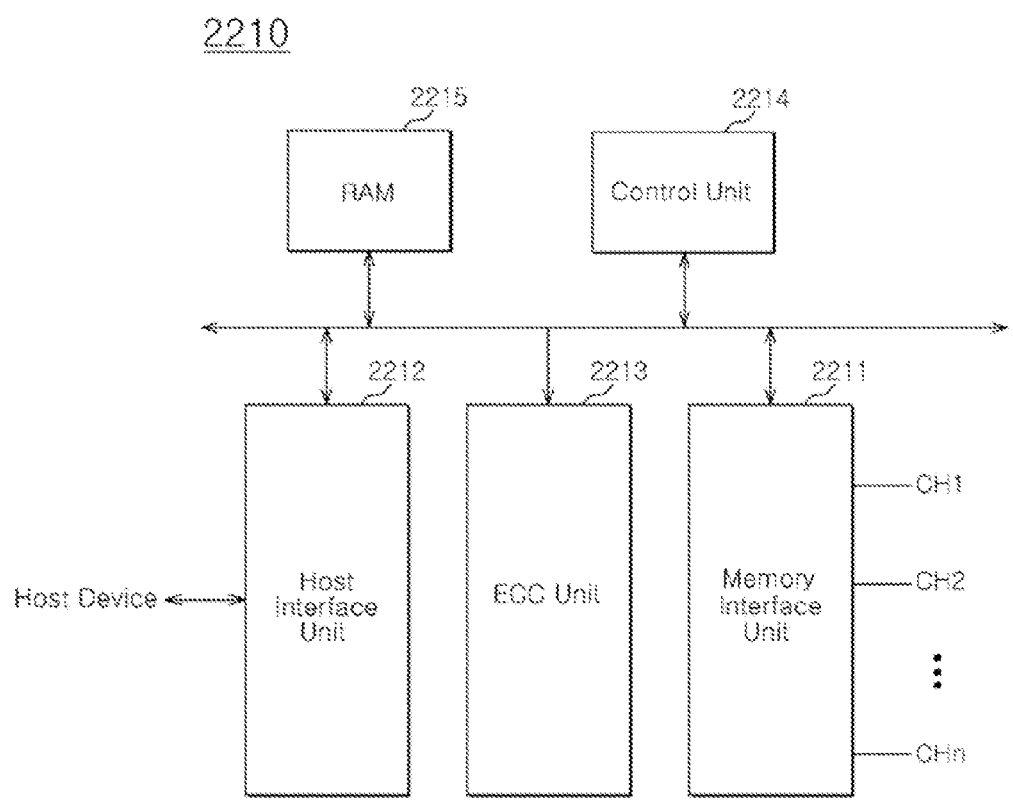
FIG. 11 is a block diagram exemplarily illustrating the SSD controller illustrated in FIG. 10.

FIG. 11 is a block diagram exemplarily illustrating the SSD controller illustrated in FIG. 10. Referring to FIG. 11, the SSD controller 2210 may include a memory interface unit 2211, a host interface unit 2212, an ECC unit 2213, a control unit 2214, and a RAM 2215.

The memory interface unit 2211 may provide a control signal such as a command and an address to the nonvolatile memory devices 2231 to 223n. The memory interface unit 2211 may exchange data with the nonvolatile memory devices 2231 to 223n. The memory interface unit 2211 may perform scattering on data transmitted from the buffer memory device 2220 to the channels CH1 to CHn according to control of the control unit 2214. The memory interface unit 2211 may transmit the data read out from the nonvolatile memory devices 2231 to 223n to the buffer memory device 2220 according to control of the control unit 2214.

The host interface unit 2212 may perform interfacing with the SSD 2200 in response to a protocol of the host device 2100. For example, the host interface unit 2212 may perform communication with the host device 2100 through a PATA protocol, a SATA protocol, a SCSI protocol, a PCI protocol, or a PCI-E protocol. The host interface unit 2212 may perform a disc emulation function which supports the host device 2100 recognizing the SSD 2200 as a hard disc drive (HDD).

The ECC unit 2213 may generate parity data based on data transmitted to the nonvolatile memory devices 2231 to 223n. The generated parity data may be stored in the nonvolatile memory devices 2231 to 223n together with the data. The ECC unit 2213 may detect an error of data read out from the nonvolatile memory devices 2231 to 223n. When the detected error is in a correctable range, the ECC unit 2213 may correct the detected error.

The control unit 2214 may analyze the signal SGL input from the host device 2100, and process the analyzed signal SGL. The control unit 2214 may control operations of the buffer memory device 2220 and the nonvolatile memory devices 2231 to 223n according to firmware or software for driving the SSD 2200. The control unit 2214 may have the same configuration as the processor 110 described with reference to FIG. 1 and may perform the same operation as the operation of the processor 110 described with reference to FIGS. 7 to 8.

The RAM 2215 may be used as a working memory for driving the firmware or software.

Figure 12:
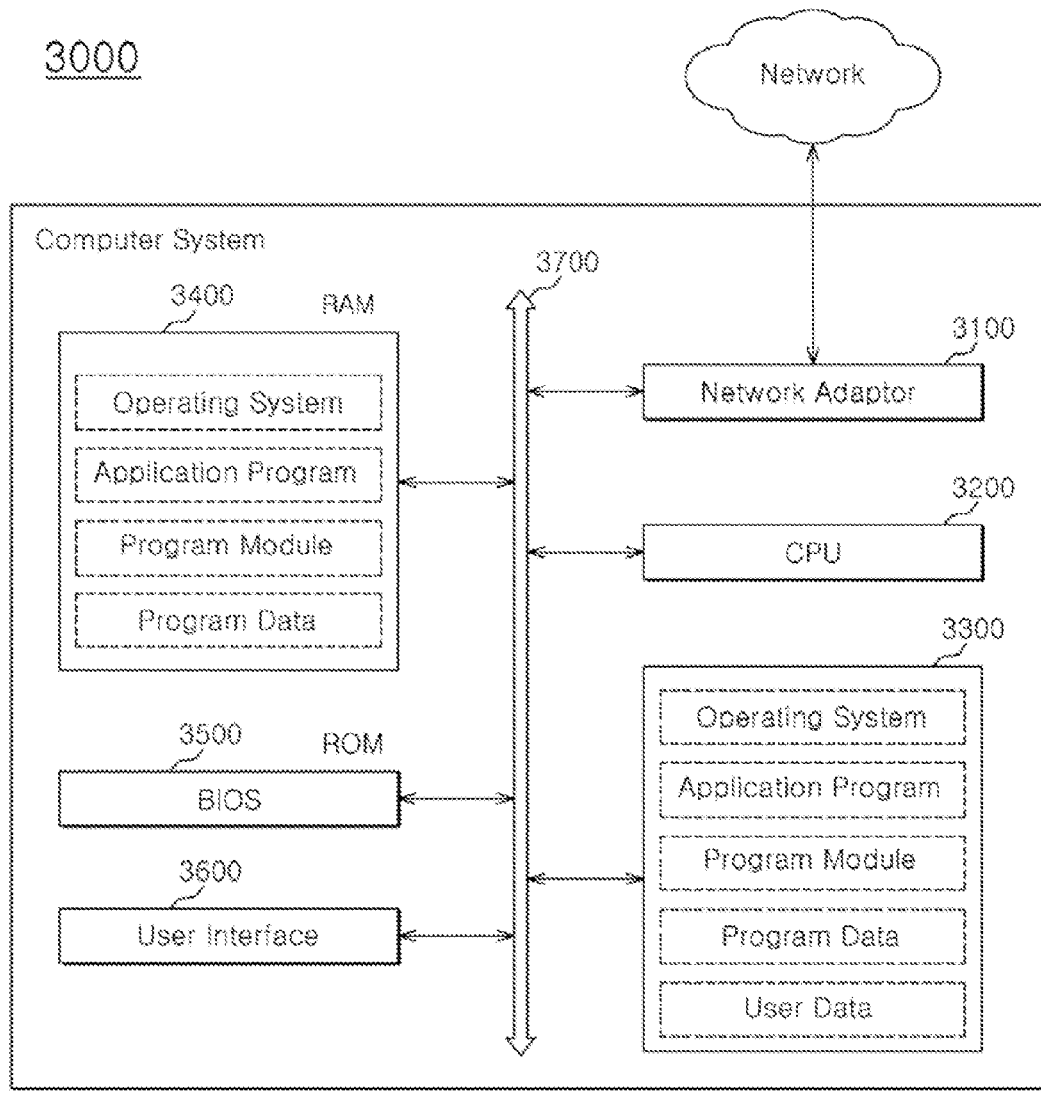
FIG. 12 is a block diagram exemplarily illustrating a computer system mounted with a data storage device according to an embodiment of the inventive concept.

FIG. 12 is a block diagram exemplarily illustrating a computer system mounted with a data storage device according to an embodiment of the inventive concept. Referring to FIG. 12, a computer system 3000 may include a network adaptor 3100, a central processing unit (CPU) 3200, a data storage device 3300, a RAM 3400, a read only memory (ROM) 3500, and a user interface 3600 which are electrically coupled to a system bus 3700. The data storage device 3300 may be configured of the data storage device 10 illustrated in FIG. 1, a data storage device 1200 illustrated in FIG. 9, or the SSD 2200 illustrated in FIG. 10.

The network adaptor 3100 may provide interfacing between the computer system 3000 and external networks. The CPU 3200 may perform various operation processes for driving an operation system or application program residing in the RAM 3400.

The data storage device 3300 may store various pieces of data required for the computer system 3000. For example, the data storage device 3300 may store an operating system, application program, various program modules, program data, user data, and the like which are for driving the computer system 3000.

The RAM 3400 may be used as a working memory of the computer system 3000. In booting of the computer system, the operating system, application program, various program modules, and program data required for driving the programs read out from the data storage device 3300 may be loaded into the RAM 3400. A basic input/output system (BIOS) which is activated even before the operating system is driven may be stored in the ROM 3500. The information exchange between the computer system 3000 and the user may be performed through the user interface 3600.

While certain embodiments have been described above, it will be understood to those skilled in the art that the embodiments described are examples only. Accordingly, the data storage device described herein should not be limited based on the described embodiments. Rather, the data storage device described herein should only be limited in light of the claims that follow when taken in conjunction with the above description and accompanying drawings.

What is claimed is:

1. A data storage device comprising:
a nonvolatile memory device comprising a plurality of memory blocks, each having a plurality of pages, wherein each of the pages is divided into a plurality of segments having predetermined segment offset values, the plurality of segments are grouped into a plurality of segment groups, each consisting of segments having the same segment offset value, and the nonvolatile memory device performs a write operation on a segment by driving a word line corresponding to the segment and transferring data to bit lines corresponding to the segment, and a controller suitable for storing data in a first segment group, among the plurality of segment groups, until the first segment group includes no more empty segments by controlling the nonvolatile memory device to perform the write operation on each of segments included in the first segment group.

2. The data storage device according to claim 1, wherein the controller stores the data in an empty segment group among the plurality of segment groups when the first segment group includes no more empty segments.

3. The data storage device according to claim 1, wherein the controller stores data in the segments included in the first segment group, in response to a page offset sequence of the plurality of pages.

4. The data storage device according to claim 1, wherein the controller performs an invalidation operation on the first segment group when the first segment group includes no more empty segments.

5. The data storage device according to claim 4, wherein the invalidation operation is performed in units of segment groups.

6. The data storage device according to claim 1, wherein the controller performs an invalidation operation on the first segment group before data are stored in a second segment group, adjacent to the first segment group, among the plurality of segment groups.

7. The data storage device according to claim 1, wherein the controller transfers valid data stored in the first segment group to another memory block when performing an invalidation operation on the first segment group.

8. The data storage device according to claim 1, wherein the controller transfers valid data stored in the first segment group to a second segment group in the same memory block when performing an invalidation operation on the first segment group.

9. The data storage device according to claim 1, wherein the predetermined segment offset values are sequentially assigned to the segments in each page.

10. A data storage device comprising:

a nonvolatile memory device comprising a first memory block having a plurality of pages, wherein each of the pages is divided into a plurality of segments having predetermined segment offset values, the plurality of segments are grouped into a plurality of segment groups, each consisting of segments having the same segment offset value, and the nonvolatile memory device performs a write operation on a segment by driving a word line corresponding to the segment and transferring data to bit lines corresponding to the segment; and a controller suitable for performing an invalidation operation on a first segment group among the plurality of segment groups when valid data remain in the first segment group, before storing data in a second segment group adjacent to the first segment group by controlling the nonvolatile memory device to perform the write operation on each of segments included in the second segment group.

11. The data storage device of claim 10, wherein the nonvolatile memory device further comprises a second memory block, and the controller transfers valid data stored in the first segment group to the second memory block when performing the invalidation operation on the first segment group.

12. The data storage device according to claim 10, wherein the controller transfers valid data stored in the first segment group to another segment group in the first memory block when performing the invalidation operation on the first segment group.

13. The data storage device according to claim 10, wherein the controller designates any one of the plurality of segment groups as open segment group, and stores data only in the open segment group until the open segment group includes no more empty spaces.

14. An operating method of a data storage device, comprising:

storing first data in a first segment of a first segment group of a first memory block through a write operation, wherein the first memory block includes a plurality of pages, each of the pages is divided into a plurality of segments having predetermined segment offset values, and the plurality of segments are grouped into a plurality of segment groups, each consisting of segments having the same segment offset value; and storing second data, which is to be stored in the first memory block subsequently to the first data, in a second segment of the first segment group through the write operation when the first segment is not the last segment of the first segment group, wherein the write operation is performed on a segment by driving a word line corresponding to the segment and transferring data to bit lines corresponding to the segment.

15. The operating method according to claim 14, further comprising:

storing the second data in a segment of a second segment group among the plurality of segment groups when the first segment is the last segment of the first segment group.

16. The operating method according to claim 15, wherein the second segment group is adjacent to the first segment group.

17. The operating method according to claim 14, further comprising:

performing an invalidation operation on the first segment group when the first segment is the last segment of the first segment group.

18. The operating method according to claim 17, wherein valid data stored in the first segment group are transferred to a second memory block when performing the invalidation operation on the first segment group.

19. The operating method according to claim 17, wherein valid data stored in the first segment group are transferred to another segment group in the first memory block when performing the invalidation operation on the first segment group.

* * * * *